United States Patent
Xiao et al.

(10) Patent No.: US 12,125,148 B2
(45) Date of Patent: Oct. 22, 2024

(54) SYSTEM AND METHODS FOR PROVIDING INVISIBLE AUGMENTED REALITY MARKERS

(71) Applicant: ADOBE INC., San Jose, CA (US)

(72) Inventors: Chang Xiao, Sunnyvale, CA (US); Ryan A. Rossi, San Jose, CA (US); Eunyee Koh, San Jose, CA (US)

(73) Assignee: ADOBE INC., San Jose, CA (US)

( * ) Notice: Subject to any disclaimer, the term of this patent is extended or adjusted under 35 U.S.C. 154(b) by 213 days.

(21) Appl. No.: 17/664,972

(22) Filed: May 25, 2022

(65) Prior Publication Data

US 2023/0386143 A1    Nov. 30, 2023

(51) Int. Cl.
- *G06T 19/00* (2011.01)
- *G06T 7/00* (2017.01)
- *G06T 7/73* (2017.01)

(52) U.S. Cl.
CPC ............. *G06T 19/006* (2013.01); *G06T 7/73* (2017.01); *G06T 7/97* (2017.01); *G06T 2207/20224* (2013.01); *G06T 2207/30204* (2013.01)

(58) Field of Classification Search
CPC .......... G06T 19/006; G06T 7/73; G06T 7/97; G06T 2207/20224; G06T 2207/30204; G06T 11/00
See application file for complete search history.

(56) References Cited

U.S. PATENT DOCUMENTS

| | | | |
|---|---|---|---|
| 9,022,292 B1 * | 5/2015 | van der Merwe | G06K 19/06037 235/383 |
| 10,504,230 B1 * | 12/2019 | Stahl | G06Q 10/087 |
| 2012/0128264 A1 * | 5/2012 | Yazdanfar | A61B 5/0059 382/274 |
| 2013/0335784 A1 * | 12/2013 | Kurtz | H04N 1/32331 358/3.28 |
| 2014/0232749 A1 * | 8/2014 | Park | G06T 19/006 345/633 |
| 2017/0337741 A1 * | 11/2017 | Fradet | G06T 19/20 |

(Continued)

FOREIGN PATENT DOCUMENTS

| | | | | |
|---|---|---|---|---|
| JP | 2017182628 A | * | 10/2017 | |
| WO | WO-2014150073 A2 | * | 9/2014 | ....... G06F 17/30867 |

OTHER PUBLICATIONS

JP-2017182628-A (Machine Translation on Feb. 19, 2024) (Year: 2017).*

Machine Translation of JP-2017182628-A on Feb. 19, 2024 (Year: 2017).*

(Continued)

*Primary Examiner* — Michael Le
(74) *Attorney, Agent, or Firm* — F. CHAU & ASSOCIATES, LLC

(57) ABSTRACT

A system and methods for providing human-invisible AR markers is described. One aspect of the system and methods includes identifying AR metadata associated with an object in an image; generating AR marker image data based on the AR metadata; generating a first variant of the image by adding the AR marker image data to the image; generating a second variant of the image by subtracting the AR marker image data from the image; and displaying the first variant and the second variant of the image alternately at a display frequency to produce a display of the image, wherein the AR marker image data is invisible to a human vision system in the display of the image.

20 Claims, 10 Drawing Sheets

(56) References Cited

U.S. PATENT DOCUMENTS

| | | | | |
|---|---|---|---|---|
| 2019/0094021 A1* | 3/2019 | Singer | ............ | G01C 15/008 |
| 2019/0362516 A1* | 11/2019 | Suzuki | ............ | G06T 7/74 |
| 2021/0400174 A1* | 12/2021 | Mine | ............ | G06T 11/60 |
| 2023/0169696 A1* | 6/2023 | Gibby | ............ | G06V 20/20 |
| | | | | 345/633 |
| 2023/0260207 A1* | 8/2023 | Robert | ............ | G06T 19/006 |
| | | | | 345/426 |

OTHER PUBLICATIONS

2Bailey, et al., "Simultaneous Localization and Mapping (SLAM): Part II", IEEE Robotics & Automation Magazine, vol. 13, No. 3, Sep. 2006, pp. 108-117, 10 pages.

3Lepetit, et al., "EPnP: An accurate O(n) solution to the PnP problem", International Journal of Computer Vision vol. 81, No. 2, Feb. 2009, 23 pages.

1Andrew, "Multiple View Geometry in Computer Vision", Kybernetes, 2001, available at https://www.emerald.com/insight/content/doi/10.1108/k.2001.30.9_10.1333.2/full/html.

4Zhang, et al., "Visual marker detection and decoding in ar systems: A comparative study", Proceedings of International Symposium on Mixed and Augmented Reality, 2002, available at https://www.computer.org/csdl/proceedings-article/ismar/2002/17810097/12OmNrHB1TZ.

* cited by examiner

SYSTEM AND METHODS FOR PROVIDING INVISIBLE AUGMENTED REALITY MARKERS

BACKGROUND

The following relates generally to augmented reality (AR). AR refers to various techniques for inserting virtual objects into an image depicting a user's physical environment. Some AR systems use AR markers to generate AR images. An AR marker is a visual cue that provides an AR device with information for positioning the AR object within the environment. Alternatively, markerless AR techniques may be used that involve scanning a user's physical environment using multiple image sensors and inserting an AR object into the detected environment.

Marker-based AR techniques may be used to produce accurate AR objects using a smaller number of sensors than markerless techniques. However, AR markers can be visibly obtrusive and can intrude on a design of an image. There is therefore need in the art for systems and methods that provide AR markers that are invisible to human vision systems.

SUMMARY

Embodiments of the present disclosure include a system and methods for providing human-invisible AR markers. By generating variants of an image that include the image and AR markers and alternately displaying the variants of the image at a frequency that is greater than a human vision system's ability to perceive, embodiments of the present disclosure provide human-invisible AR markers that are nevertheless visible to an image sensor, thereby providing a user with an AR experience that does not rely on the multiple image sensors and increased processing power typical of markerless AR techniques, but also does not rely on obtrusive, human-visible AR markers that are typical of conventional marker-based AR techniques.

A method, apparatus, non-transitory computer readable medium, and system for providing human-invisible augmented reality markers are described. One or more aspects of the method, apparatus, non-transitory computer readable medium, and system include identifying AR metadata associated with an object in an image; generating AR marker image data based on the AR metadata; generating a first variant of the image by adding the AR marker image data to the image; generating a second variant of the image by subtracting the AR marker image data from the image; and displaying the first variant and the second variant of the image alternately at a display frequency to produce a display of the image, wherein the AR marker image data is invisible to a human vision system in the display of the image.

A method, apparatus, non-transitory computer readable medium, and system for providing human-invisible augmented reality markers are described. One or more aspects of the method, apparatus, non-transitory computer readable medium, and system include receiving a display of an image that includes a first variant of the image alternated with a second variant of the image, wherein the first variant of the image comprises an AR marker image added to the image, and the second variant of the image comprises the AR marker image subtracted from the image; detecting the AR marker image based on the first variant and the second variant of the image; extracting AR metadata from the AR marker image; and displaying an AR image based on the AR metadata.

A system for providing human-invisible augmented reality markers is described. One or more aspects of the system include an AR metadata component configured to identify AR metadata associated with an object in an image; an encoder configured to generate AR marker image data based on the AR metadata, generate a first variant of the image by adding the AR marker image data to the image, and generate a second variant of the image by subtracting the AR marker image data from the image; and a screen configured to display the first variant and the second variant of the image alternately at a display frequency to produce a display of the image, wherein the AR marker image data is invisible to a human vision system in the display of the image.

DETAILED DESCRIPTION

Figure 1:
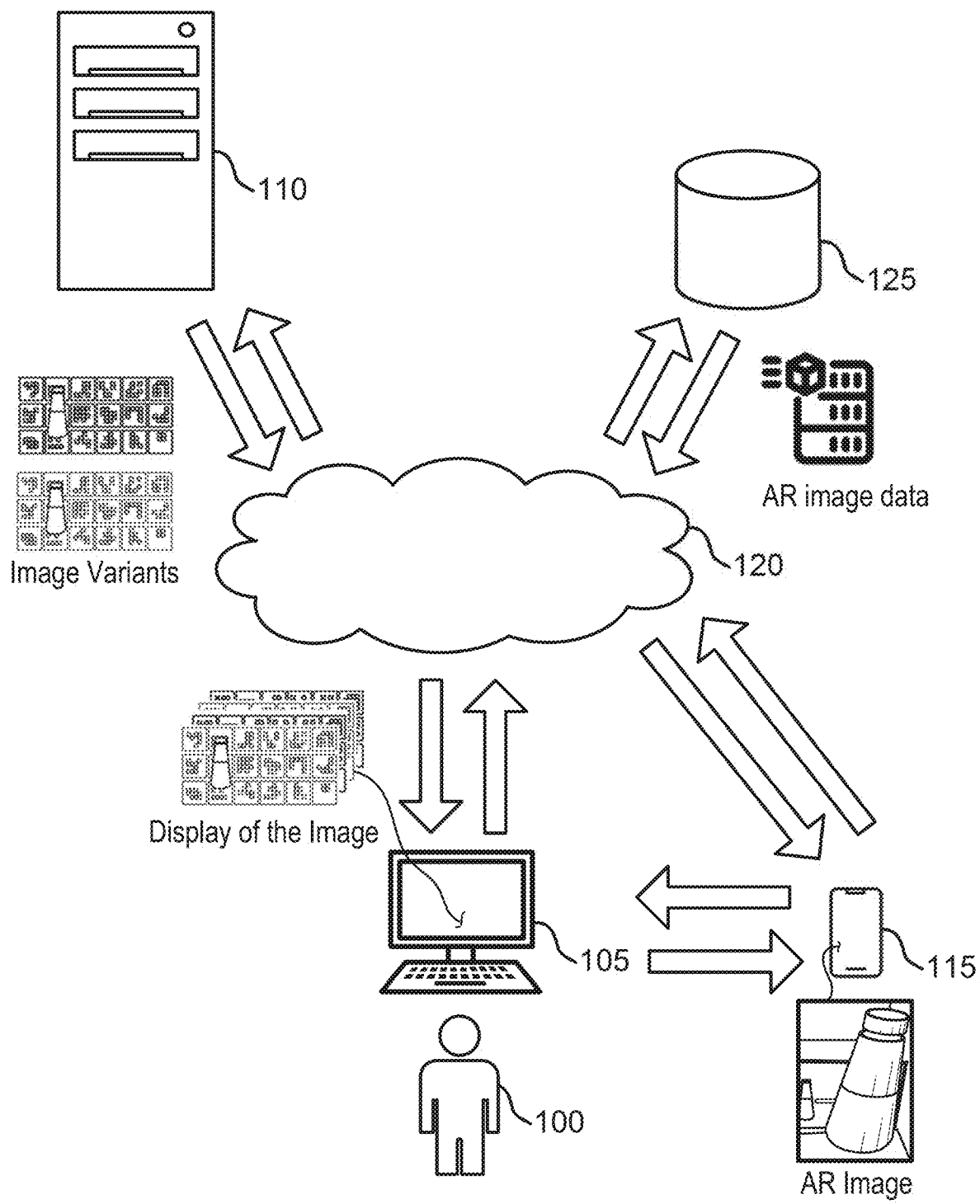
FIG. 1 shows an example of an AR system according to aspects of the present disclosure.

The present disclosure relates to Augmented Reality (AR). AR includes techniques for inserting virtual objects into an image depicting a user's physical environment. Embodiments of the disclosure include systems and methods for producing unobtrusive AR markers to enable the generation of AR images. An AR marker is a visual cue that provides an AR device with information for positioning an AR object. In some embodiments, AR devices use AR markers to produce images using a single optical sensor.

Marker-based AR techniques may produce accurate AR objects. However, AR markers can be visibly obtrusive. Therefore, markerless AR techniques have been developed. Markerless AR techniques involve scanning an environment and inserting objects based on the scanning. However, some markerless techniques depend on the use of multiple sensors and a significant amount of computation.

Embodiments of the present disclosure provide unobtrusive AR markers by generating a variant of an image that includes AR markers and a variant of the image without the AR markers (or with a negative of the AR marker). A device can alternately display the variants of the image at a frequency that is greater than a human vision system's ability to perceive, thereby producing a visual effect that renders the AR markers invisible to a human observer.

In one aspect, an AR system includes an AR marker apparatus for generating AR markers, and a device for reading the AR markers and displaying an AR image. In some cases, an AR metadata component of the AR marker apparatus retrieves AR metadata associated with an object depicted in an original image and generates AR marker image data based on the AR metadata. In some cases, the AR marker apparatus includes an encoder that generates a first variant and a second variant of the image by respectively adding and subtracting (or refraining from adding) the AR marker image data from the image.

In some cases, because the AR marker image data is added to the first variant of the image and subtracted from the second variant of the image on a per-pixel basis, the first variant and the second variant of the image each include first same pixels corresponding to the original image, and each include second pixels corresponding to numerically opposite AR marker image data variants that nevertheless include the same magnitude as each other. Because the second pixels correspond to AR marker image data variants that have the same magnitude as each other, the information provided by the AR marker image data variants is the same, and an AR apparatus of the system therefore does not experience an interruption in information received from the AR marker image data via a camera of the AR apparatus when the first variant and the second variant of the image are alternately displayed.

In some cases, the AR marker apparatus displays the first variant and the second variant of the image alternately via a screen at a display frequency to produce a display of the image, where the AR marker image data is invisible to a human vision system in the display of the image. In some cases, a camera can perceive changes that occur in visual information at a much greater rate than a human vision system. Therefore, by alternately displaying the first variant and the second variant of the image at a rate that is greater than a human vision system, but not a camera, can perceive, the system effectively provides an image that includes AR markers that do not intrude on the design of the image.

An AR marker refers to a image or a portion of an image that includes encoded information that can be decoded to obtain information for how to display an AR image.

The information encoded in an AR marker can be referred to as AR metadata. In some cases, the AR metadata includes coordinate positions for determining a camera position, such that an AR object is able to be properly positioned in relation to the image captured by the camera. In some cases, the AR metadata includes AR image data or includes a pointer to AR image data.

AR image data refers to information that describes three-dimensional characteristics of an object, such that the object can be displayed as an AR object in an AR image. An AR image includes a background image (typically a background image that is being captured by a camera) overlaid by the AR object. By manipulating the viewpoint of the camera, the AR object can be placed in different positions on the background image.

An embodiment of the present disclosure can be used in a product testing context. For example, a digital content channel (such as a website or an HTML-enabled email) displays an image that depicts a product. The digital content channel can provide the image and AR metadata associated with the product to the system. The AR marker apparatus of the system then encodes and provides the display of the image including the first variant and second variant of the image on the digital content channel via a screen of a user device of the system. The display of the image is identical in appearance as the original image to the user. The user can then use an AR apparatus of the system to generate an AR image based on the AR metadata encoded in the display of the image and thereby test how the product looks in their own environment without having physical possession of the product.

Figure 6:
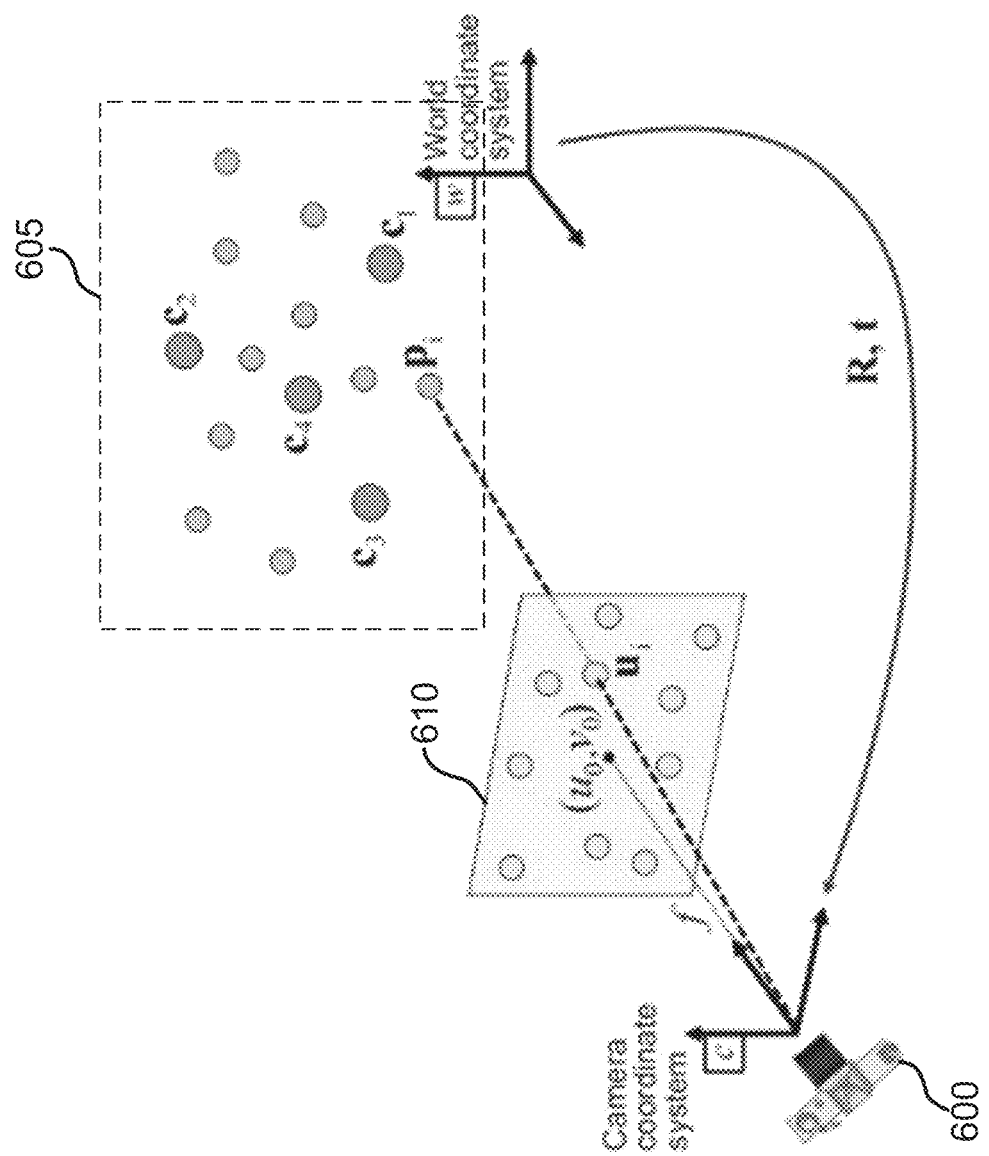
FIG. 6 shows an example of position coordinate detection according to aspects of the present disclosure.
Figure 7:
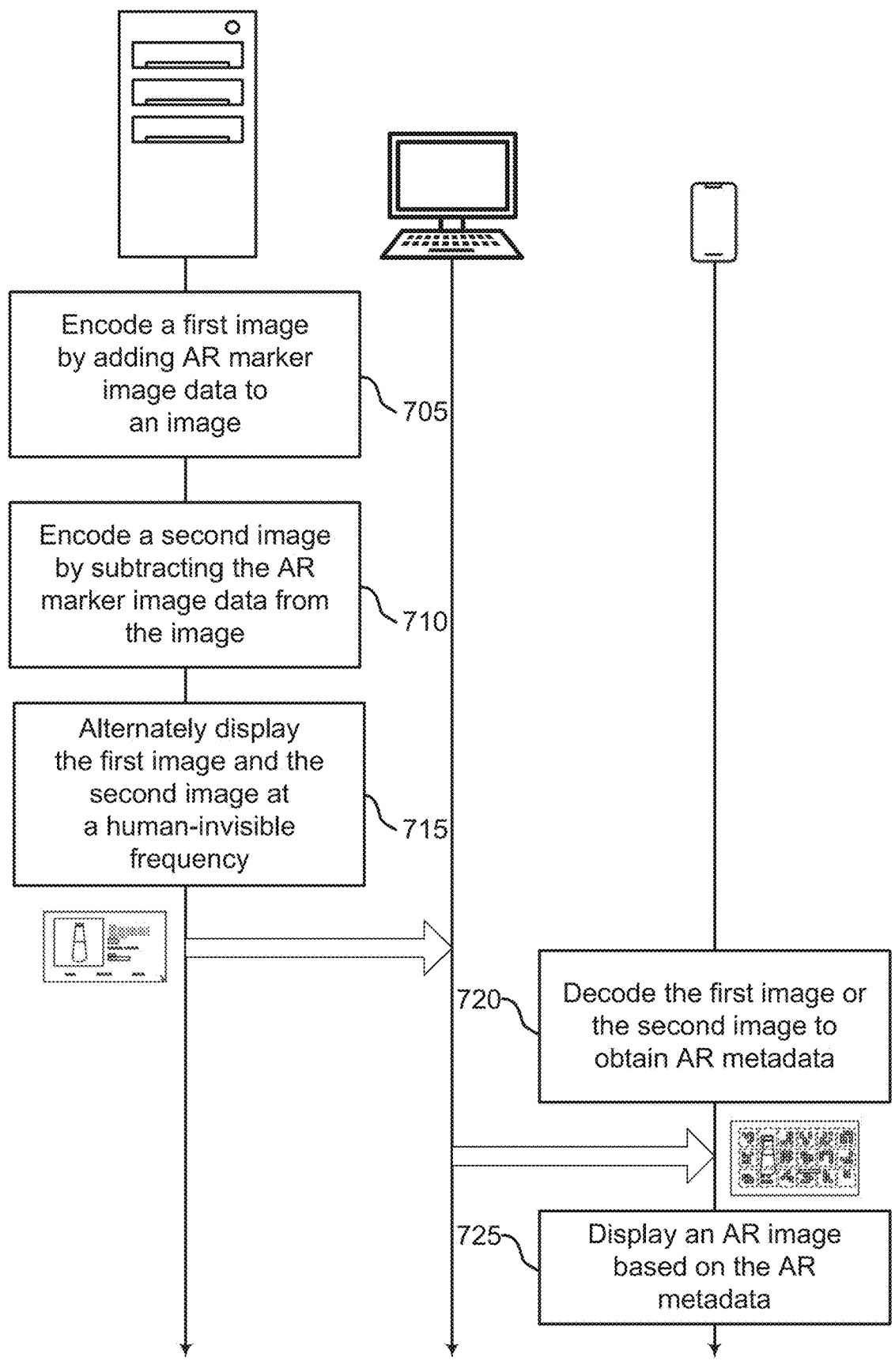
FIG. 7 shows an example of providing invisible AR markers according to aspects of the present disclosure.

An example application of the present disclosure in a product testing context is provided with reference to FIGS. 1 and 7. Details regarding the architecture of an AR marker system are provided with reference to FIGS. 1-6. Examples of a process for providing human-invisible AR markers are provided with reference to FIGS. 7-10.

AR System

A system for generating AR images is described with reference to FIGS. 1-6. One or more aspects of the system include an AR marker apparatus including an AR metadata component configured to identify AR metadata associated with an object in an image; an encoder configured to generate AR marker image data based on the AR metadata, generate a first variant of the image by adding the AR marker image data to the image, and generate a second variant of the image by subtracting the AR marker image data from the image; and a screen configured to display the first variant and the second variant of the image alternately at a display frequency to produce a display of the image, wherein the AR marker image data is invisible to a human vision system in the display of the image.

Some examples of the system further include a cloud storage location configured to store and provide AR image data. Some examples of the system further include an AR apparatus configured to receive the display of the image, detect the AR marker image data, and extract the AR metadata from the AR marker image data. In some aspects, the AR apparatus further comprises an AR display configured to display an AR image based on the AR metadata.

FIG. 1 shows an example of an AR system according to aspects of the present disclosure. The example shown includes user 100, user device 105, AR marker apparatus 110, AR apparatus 115, cloud 120, and database 125.

Referring to FIG. 1, AR marker apparatus 110 generates variations of an image by combining the image with AR marker image data that encodes AR metadata. In some cases, the AR marker apparatus 110 retrieves the image and the AR metadata from a digital content channel such as a website or an HTML-enabled email, and generates the AR marker image data based on the AR metadata. According to some aspects, AR marker apparatus 110 alternately displays the variations of the image on a screen of user device 105 at a frequency that is invisible to a human vision system to produce the display of the image.

For example, because the AR marker image data is combined with the image by respectively adding and subtracting the AR marker image data to and from the image, the alteration frequency of the display of the image produces a visual effect that renders the AR marker image data invisible to a human observer of the display of the image, but allows a camera of AR apparatus 115 (that can recognize changes in visual information at a much greater rate than human vision systems) to capture the AR marker image data.

The display of the image generated by the AR marker system therefore includes a series of images that are indistinguishable from an original single image to a user, but that includes AR marker image data for AR apparatus 115. The AR marker system thereby provides access to information for generating an AR image that does not rely on the use of a more expensive and technologically demanding markerless AR apparatus, but also does not compromise the visual design of the original single image by including human-visible AR markers in the image.

According to some aspects, AR apparatus 115 generates the AR image by recording a video of the display of the image using the camera, detecting the camera-visible AR marker image data, extracting the AR metadata from the AR marker image data, and displaying an AR image based on the AR metadata. According to some aspects, the AR metadata includes a pointer to AR image data stored in database 125 that describes three-dimensional characteristics of an object depicted in the original image (such as scale and surface appearance). In some aspects, the AR metadata also includes positioning coordinate information that provides AR apparatus 115 with camera calibration information so that AR apparatus 115 can properly scale and position the object as an AR object overlaid on a background image captured by the camera in the AR image.

According to some aspects, user device 105 is a personal computer, laptop computer, mainframe computer, palmtop computer, personal assistant, mobile device, or any other suitable processing apparatus. In some examples, user device 105 includes software such a web browser that allows user 100 to view and interact with images on digital content channels. In some cases, the image and the display of the image are provided on a digital content channel that user 100 visits via the web browser.

According to some aspects, a user interface enables user 100 to interact with user device 105. In some embodiments, the user interface may include an audio device, such as an external speaker system, an external display device such as a display screen, or an input device (e.g., a remote-control device interfaced with the user interface directly or through an IO controller module). In some cases, the user interface may be a graphical user interface (GUI).

According to some aspects, user device 105 includes a screen. In some aspects, the screen displays a first variant and a second variant of the image alternately at a display frequency to produce the display of the image, where the AR marker image data is invisible to a human vision system in the display of the image. In some examples, the screen displays the image alternately with the first variant and the second variant of the image. In some cases, the screen comprises a conventional monitor, a monitor coupled with an integrated display, an integrated display (e.g., an LCD display), or other means for viewing data or processing information. In some examples, a refresh rate of the screen is at least 60 Hz. User device 105 is an example of, or includes aspects of, the corresponding element described with reference to FIG. 5.

According to some aspects, AR marker apparatus 110 includes a computer implemented network. In some embodiments, AR marker apparatus 110 also includes one or more processors, a memory subsystem, a communication interface, an I/O interface, one or more user interface components, and a bus. Additionally, in some embodiments, AR marker apparatus 110 communicates with user device 105, AR apparatus 115, and database 125 via cloud 120.

In some cases, AR marker apparatus 110 is implemented on a server. A server provides one or more functions to users linked by way of one or more of various networks, such as cloud 120. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, the server is configured to send and receive hypertext markup language (HTML) formatted files (e.g., for displaying web pages). In various embodiments, the server comprises a general purpose computing device, a personal computer, a laptop computer, a mainframe computer, a supercomputer, or any other suitable processing apparatus. Further detail regarding the architecture of AR marker apparatus 110 is provided with reference to FIGS. 2 and 3.

According to some aspects, AR apparatus 115 is a computing device such as a smartphone, a tablet, a laptop computer, a personal computer, a digital camera, or other processing apparatus that includes a camera for recording video, a processor unit, a memory unit, and a display. AR apparatus 115 is an example of, or includes aspects of, the corresponding element described with reference to FIGS. 4 and 5. Further detail regarding the architecture of AR apparatus 115 is provided with reference to FIGS. 4, 5, and 6.

A cloud such as cloud 120 is a computer network configured to provide on-demand availability of computer system resources, such as data storage and computing power. In some examples, cloud 120 provides resources without active management by user 100. The term "cloud" is sometimes used to describe data centers available to many users over the Internet. Some large cloud networks have functions distributed over multiple locations from central servers. A server is designated an edge server if it has a direct or close connection to a user. In some cases, cloud 120 is limited to a single organization. In other examples, cloud 120 is available to many organizations. In one example, cloud 120 includes a multi-layer communications network comprising multiple edge routers and core routers. In another example, cloud 120 is based on a local collection of switches in a single physical location. According to some aspects, cloud 120 provides communications between user device 105, AR marker apparatus 110, AR apparatus 115, and database 125.

A database such as database 125 is an organized collection of data. In an example, database 125 stores data in a specified format known as a schema. According to some aspects, database 125 is structured as a single database, a distributed database, multiple distributed databases, or an emergency backup database. In some cases, a database controller manages data storage and processing in database 125. In some cases, user 100 interacts with the database controller. In other cases, the database controller operates automatically without user interaction. According to some aspects, database 125 is a cloud storage location configured to store and provide AR image data. In some embodiments, database 125 is external to AR marker apparatus 110 and communicates with AR marker apparatus 110 via cloud 120. In some embodiments, database 125 is included in AR marker apparatus 110.

Figure 8:
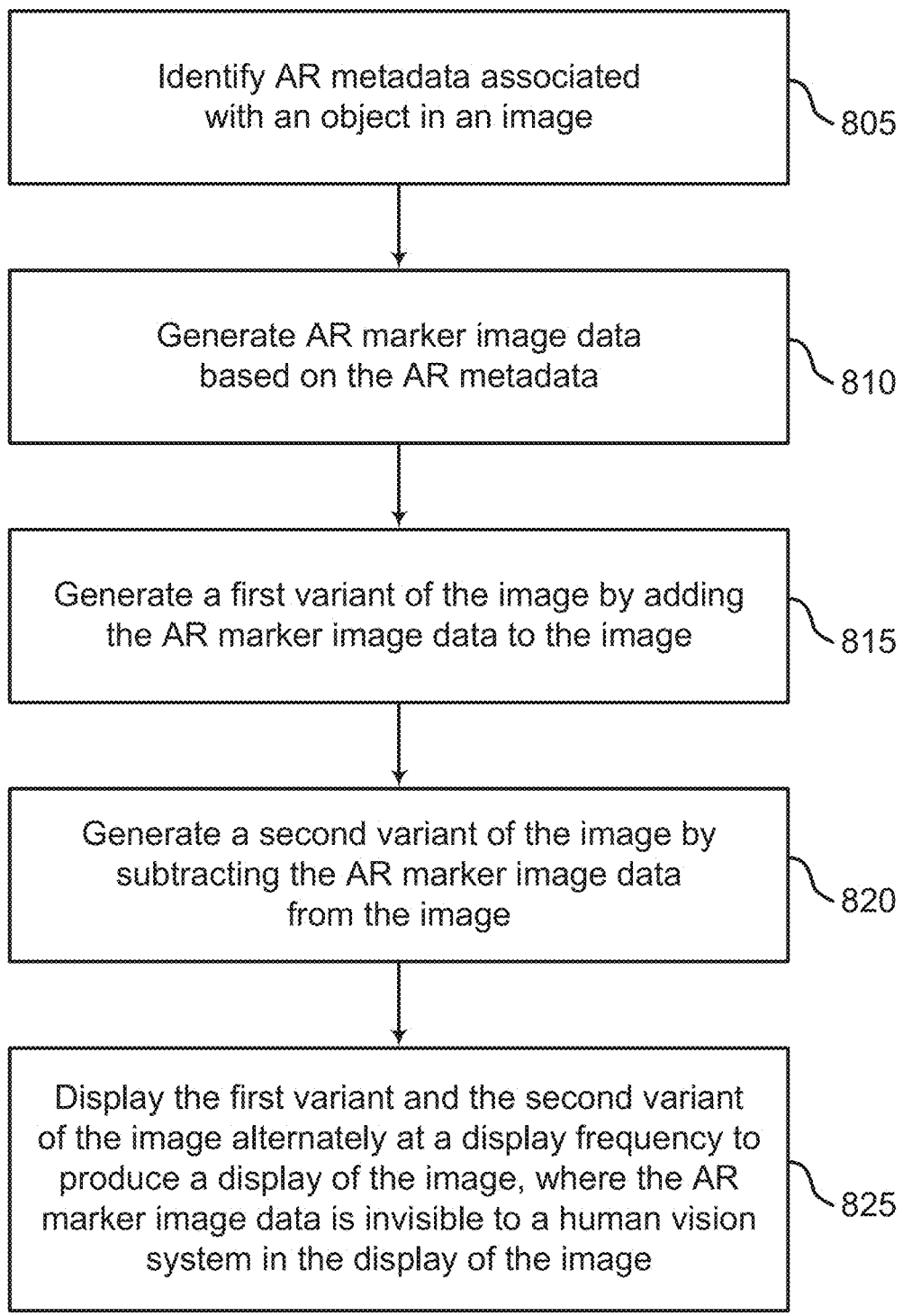
FIG. 8 shows an example of displaying AR marker image data according to aspects of the present disclosure.
Figure 9:
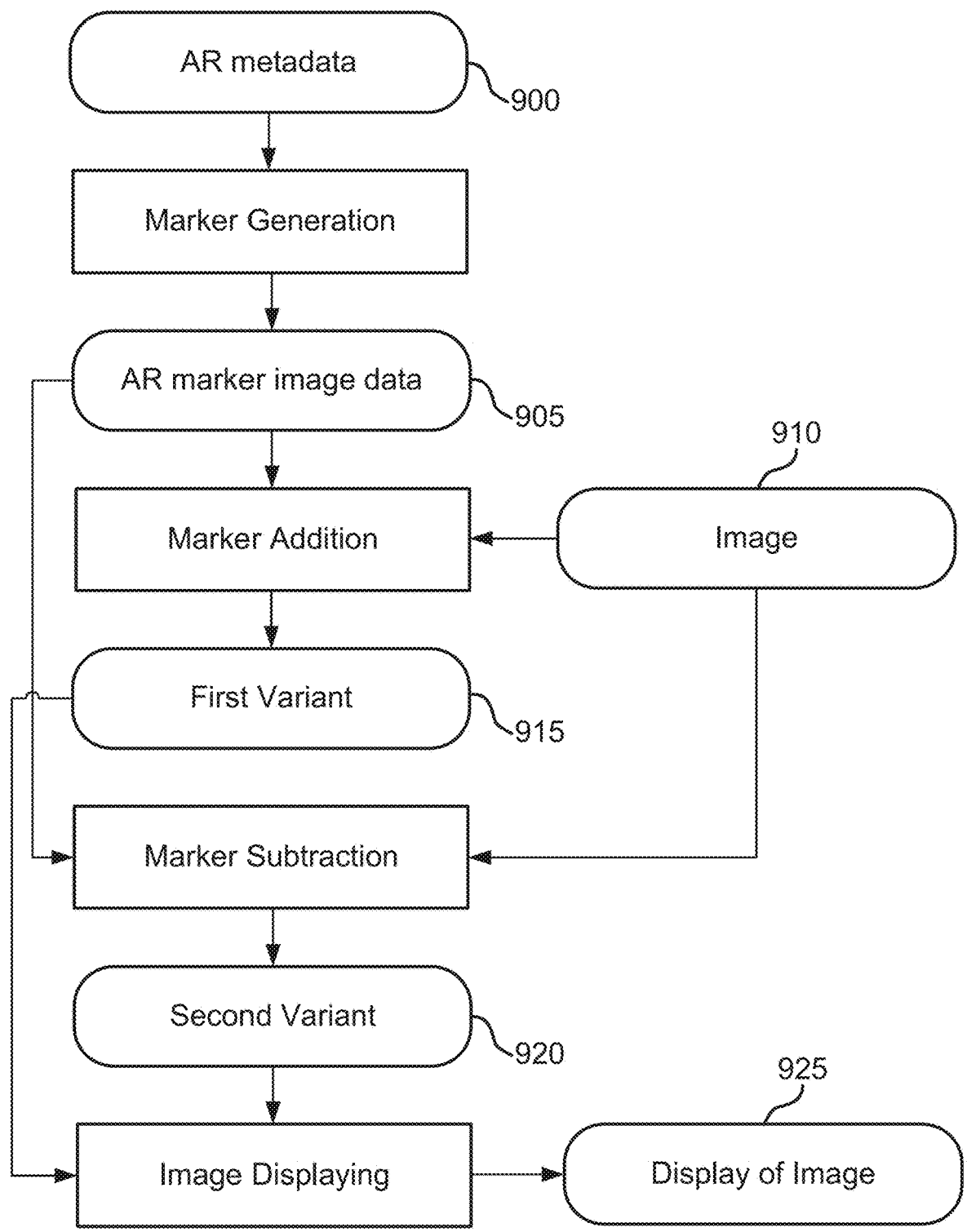
FIG. 9 shows an example of providing a display of an image according to aspects of the present disclosure.

Further details regarding a process for providing human-invisible AR markers are provided with reference to FIGS. 7-9. Further details regarding a process for generating an AR image using human-invisible AR markers are provided with reference to FIG. 10.

Figure 2:
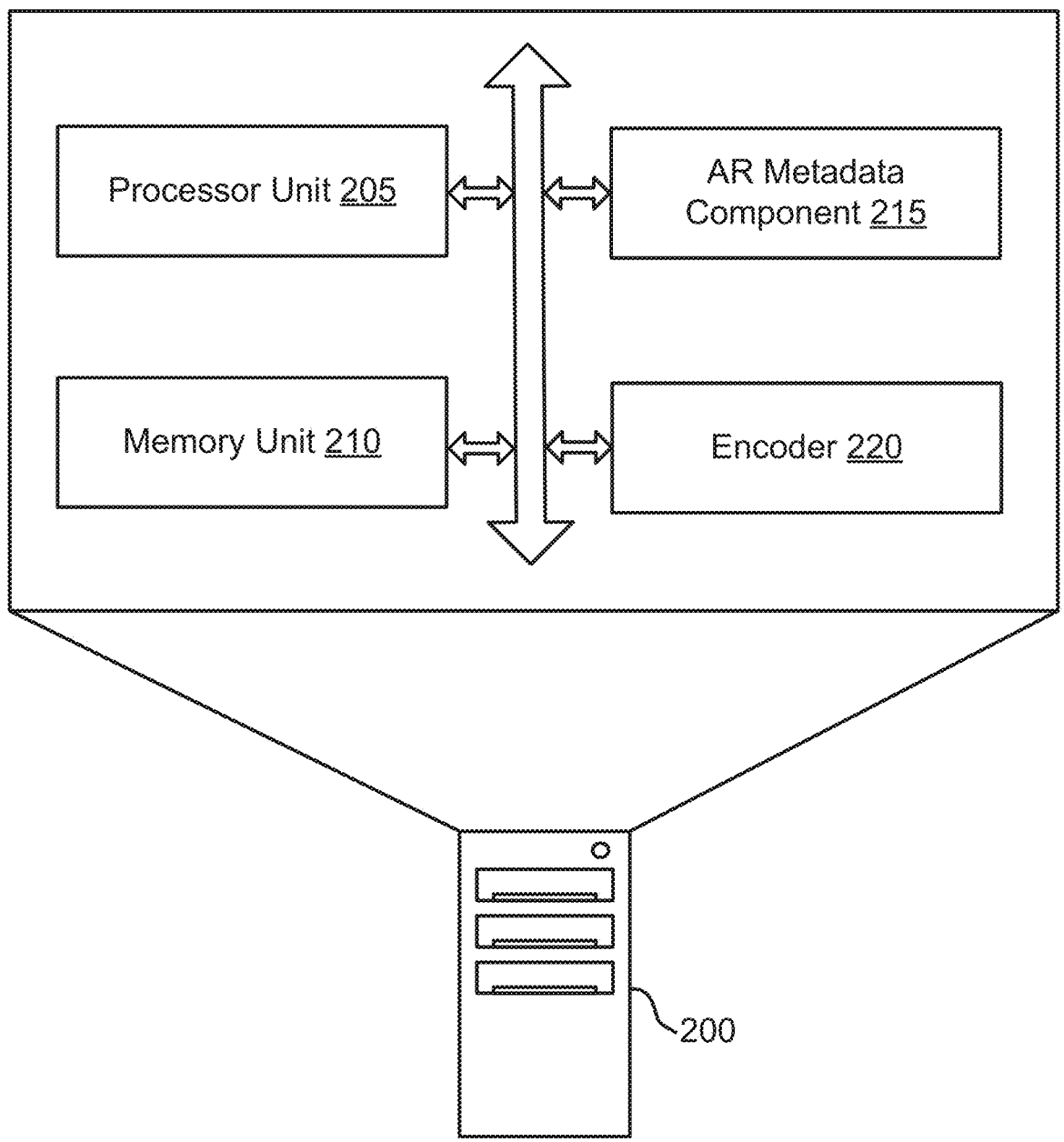
FIG. 2 shows an example of an AR marker apparatus according to aspects of the present disclosure.

FIG. 2 shows an example of an AR marker apparatus according to aspects of the present disclosure. AR marker apparatus 200 is an example of, or includes aspects of, the corresponding element described with reference to FIG. 1. In one aspect, AR marker apparatus 200 includes first processor unit 205, first memory unit 210, AR metadata component 215, and encoder 220.

First processor unit 205 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof. In some cases, first processor unit 205 is configured to operate a memory array using a memory controller. In other cases, a memory controller is integrated into first processor unit 205. In some cases, first processor unit 205 is configured to execute computer-readable instructions stored in first memory unit 210 to perform various functions. In some embodiments, first processor unit 205 includes special purpose components for modem processing, baseband processing, digital signal processing, or transmission processing.

First memory unit 210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor of first processor unit 205 to perform various functions described herein. In some cases, first memory unit 210 includes a basic input/output system (BIOS) that controls basic hardware or software operations, such as an interaction with peripheral components or devices. In some cases, first memory unit 210 includes a memory controller that operates memory cells of first memory unit 210. For example, the memory controller may include a row decoder, column decoder, or both. In some cases, memory cells within first memory unit 210 store information in the form of a logical state.

According to some aspects, AR metadata component 215 identifies AR metadata associated with an object in an image. In some examples, AR metadata component 215 extracts the AR metadata from a digital content channel, where the display of the image is provided within the digital content channel. In some aspects, the AR metadata includes data for displaying an AR version of the object. In some aspects, the AR metadata includes an address pointing to a storage location for AR image data. In some examples, AR metadata component 215 generates an HTML script including the first variant and the second variant of the image, where the display of the image is based on the HTML script.

According to some aspects, AR metadata component 215 is configured to identify AR metadata associated with an object in an image. According to some aspects, AR metadata component 215 is implemented as a hardware circuit, as firmware, or as software.

According to some aspects, encoder 220 generates AR marker image data based on the AR metadata. In some examples, encoder 220 generates a first variant of the image by adding the AR marker image data to the image. In some examples, encoder 220 generates a second variant of the image by subtracting the AR marker image data from the image. In some aspects, the first variant of the image is generated by adding pixel values of the AR marker image data to corresponding pixel values of the image, respectively. In some aspects, the second variant of the image is generated by subtracting pixel values of the AR marker image data from the corresponding pixel values of the image, respectively. In some examples, encoder 220 multiplies the AR marker image data by the visibility parameter to obtain scaled AR marker image data, where the first variant and the second variant of the image are generated based on the scaled AR marker image data. In some aspects, the AR marker image data includes an AR marker code.

According to some aspects, encoder 220 is configured to generate AR marker image data based on the AR metadata, generate a first variant of the image by adding the AR marker image data to the image, and generate a second variant of the image by subtracting the AR marker image data from the image. According to some aspects, encoder 220 is implemented as a hardware circuit, as firmware, or as software.

Figure 3:
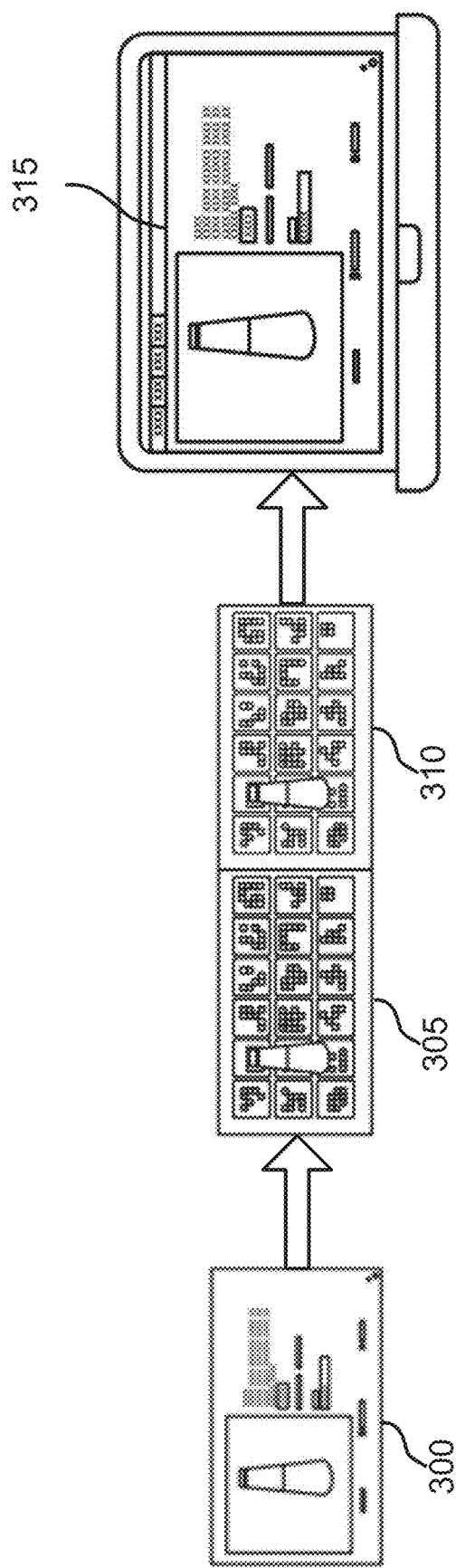
FIG. 3 shows an example of encoding AR marker image data according to aspects of the present disclosure.

FIG. 3 shows an example of encoding AR marker image data according to aspects of the present disclosure. The example shown includes image 300, first variant of the image 305, second variant of the image 310, and display of the image 315.

Referring to FIG. 3, an encoder of an AR marker apparatus described with reference to FIG. 2 receives image 300, encodes first variant of the image 305 by adding AR marker image data to image 300, and encodes second variant of the image 310 by subtracting the AR marker image data from the image 300. As shown by FIG. 3, the first variant of the image 305 and the second variant of the image 310 both include pixels corresponding to pixels of the original image, as well as pixels corresponding to the AR marker image data that are numerically opposite but equally magnitudinous to each other. Therefore, when the first variant of the image 305 and the second variant of the image 310 are alternately displayed at a predetermined frequency to produce display of the image 315, the AR marker image data in display of the image 315 is invisible to a human vision system, and display of the image 315 therefore appears identical to image 300 to a human observer. Operations of the AR marker apparatus are described in further detail with reference to FIGS. 8 and 9.

Image 300 is an example of, or includes aspects of, the corresponding element described with reference to FIG. 9. First variant of the image 305 is an example of, or includes aspects of, the corresponding element described with reference to FIG. 9. Second variant of the image 310 is an example of, or includes aspects of, the corresponding element described with reference to FIG. 9. Display of the image 315 is an example of, or includes aspects of, the corresponding element described with reference to FIG. 9.

Figure 4:
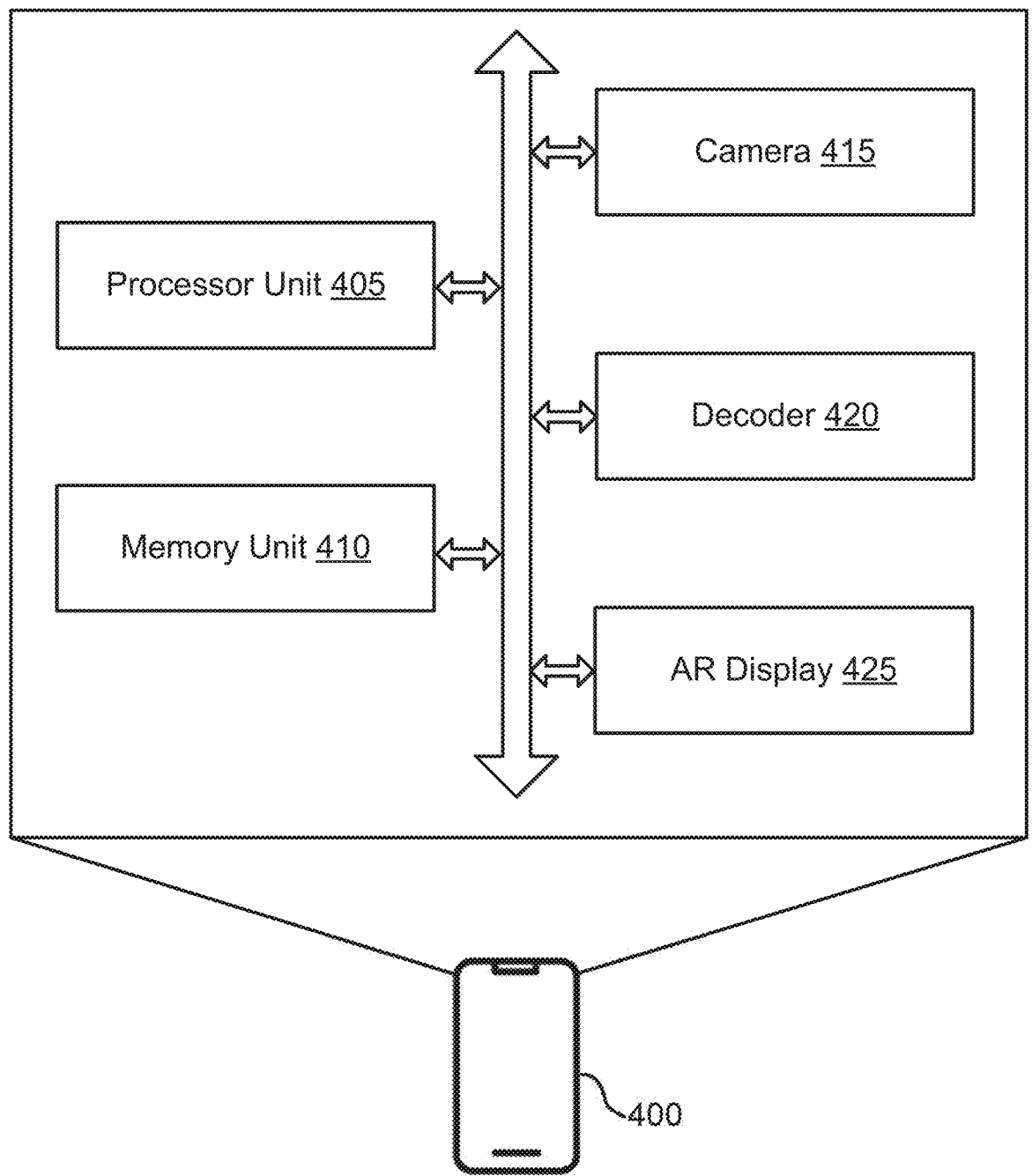
FIG. 4 shows an example of an AR apparatus according to aspects of the present disclosure.

FIG. 4 shows an example of an AR apparatus according to aspects of the present disclosure. AR apparatus 400 is an example of, or includes aspects of, the corresponding element described with reference to FIGS. 1 and 5. In one aspect, AR apparatus 400 includes second processor unit 405, second memory unit 410, camera 415, decoder 420, and AR display 425.

According to some aspects, AR apparatus 400 receives the display of the image. In some examples, AR apparatus 400 decodes the first variant or the second variant of the image to obtain the AR metadata. In some examples, AR apparatus 400 generates an AR display corresponding to the object. In some examples, AR apparatus 400 overlays the AR display on the image based on the AR metadata.

According to some aspects, AR apparatus 400 is configured to receive the display of the image, detect the AR marker image, and extract the AR metadata from the AR marker image data.

According to some aspects, second processor unit 405 includes aspects of the first processor unit described with reference to FIG. 2. According to some aspects, second memory unit 410 includes aspects of the first memory unit described with reference to FIG. 2.

According to some aspects, camera 415 receives a display of an image that includes a first variant of the image alternated with a second variant of the image, where the first variant of the image includes an AR marker image added to the image, and the second variant of the image includes the AR marker image subtracted from the image. Camera 415 is an example of, or includes aspects of, the corresponding element described with reference to FIG. 6.

According to some aspects, decoder 420 detects the AR marker image based on the first variant and the second variant of the image. In some examples, decoder 420 extracts AR metadata from the AR marker image. In some examples, decoder 420 decodes the AR marker image based on an AR marker detection library to obtain the AR metadata. In some examples, decoder 420 performs a noise reduction algorithm based on the first variant and the second variant of the image to obtain an enhanced image, where the AR marker image is detected based on the enhanced image. In some examples, decoder 420 detects position coordinates for an AR object based on the AR metadata.

In some examples, decoder 420 identifies an address pointing to a storage location for AR image data. In some examples, decoder 420 retrieves the AR image data from the storage location, where the AR image is displayed based on the AR image data. According to some aspects, decoder 420 is implemented as a hardware circuit, as firmware, or as software.

According to some aspects, AR display 425 displays an AR image based on the AR metadata. In some examples, AR display 425 overlays the AR object on a background image based on the position coordinates, where the AR image includes the AR object overlaid on the background image.

According to some aspects, AR display 425 is configured to display an AR image based on the AR metadata. According to some aspects, AR display 425 comprises a conventional monitor, a monitor coupled with an integrated display, an integrated display (e.g., an LCD display), or other means for viewing data or processing information.

Figure 5:
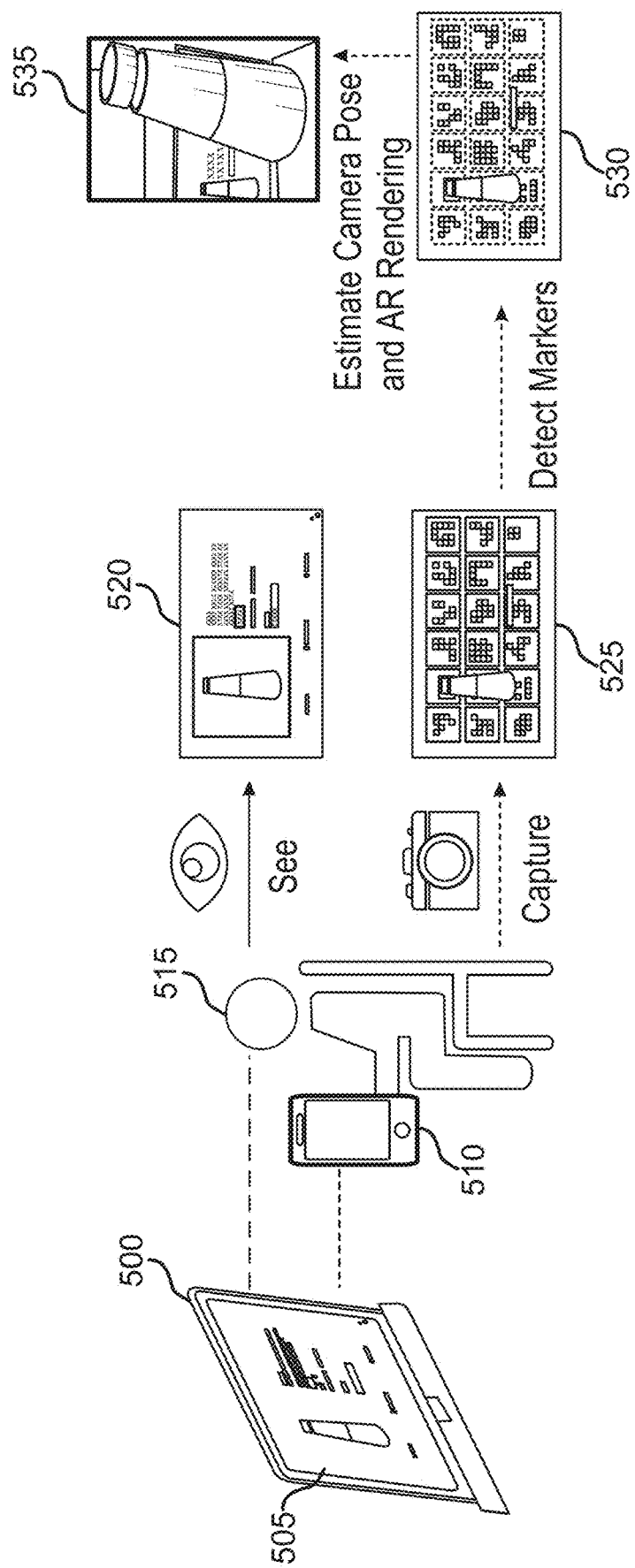
FIG. 5 shows an example of a display of an AR image according to aspects of the present disclosure.

FIG. 5 shows an example of display of an AR image according to aspects of the present disclosure. The example shown includes user device 500, display of an image 505, AR apparatus 510, user 515, display of the image as seen by the user 520, display of the image as seen by the AR apparatus 525, detected AR marker image 530, and AR image 535.

Referring to FIG. 5, an AR marker apparatus described with reference to FIGS. 1 and 2 provides user device 500 with display of an image 505. In an example, display of the image 505 is produced by alternately displaying a first variant and a second variant of the image including AR marker image data at a human-invisible frequency as described with reference to FIG. 8. User 515 records display of the image 505 via a camera included in AR apparatus 510 as described with reference to FIG. 10. Display of the image as seen by the user 520 is identical to the image, as pixels included in both the first variant and the second variant either do not change (as they correspond to the image) or change at a rate faster than a human vision system can perceive (as they correspond to numerically opposite but equally magnitudinous AR marker image data).

However, display of the image as seen by the AR apparatus 525 (captured by recording a video of display of the image 505 via the camera of AR apparatus 510) includes the AR marker image data, as the camera is capable of perceiving changes in images at a greater frequency than human vision systems. Therefore, the camera is able to detect at least some of the markers displayed in the display of the image as seen by the AR apparatus 525 to obtain detected AR marker image 530.

In some aspects, AR apparatus 510 decodes the detected markers included in detected AR marker image 530 to obtain AR metadata that allows AR apparatus 510 to estimate the pose (e.g., position) of the camera and render an object depicted in the image as an AR object in AR image 535. AR image 535 includes the AR object as well as the background image that is seen by the camera and provided to the display of AR apparatus 510. In this case, the background image includes a partial view of user device 500. According to some aspects, the AR apparatus continuously renders the AR object in AR image 535 as long as a minimum number of AR markers are detected by AR apparatus 510.

User device 500 is an example of, or includes aspects of, the corresponding element described with reference to FIG. 1. AR apparatus 510 is an example of, or includes aspects of, the corresponding element described with reference to FIGS. 1 and 4. User 515 is an example of, or includes aspects of, the corresponding element described with reference to FIG. 1.

FIG. 6 shows an example of position coordinate detection according to aspects of the present disclosure. The example shown includes camera 600, AR marker center points 605, and AR marker center projections 610. Camera 600 is an example of, or includes aspects of, the corresponding element described with reference to FIG. 4.

Referring to FIG. 6, an AR apparatus described with reference to FIGS. 1, 4, and 5 includes a camera that is calibrated by using a decoder of the AR apparatus to detect at least a predetermined number of AR marker center points 605 displayed in a video recorded by the camera and provided to the decoder. As shown in FIG. 6, detected AR marker center points are labeled c, and include an AR marker center point $p_i$. The detected AR marker center points c provide three-dimensional points in a world coordinate system, and can be projected as camera coordinate system points (AR marker center projections 610) in the two-dimensional video displayed in an AR display of the AR apparatus. As show in FIG. 6, $u_i$ is a two-dimensional projection of $p_i$.

Given a sufficient number of detected AR marker center points c in the word coordinate system, their projections in the camera coordinate system, and the focal length f of the camera, the decoder can determine the position of the camera, and thus an AR object overlayed on the video in an AR display of the AR apparatus, in relation to both the world coordinate system and the camera coordinate system (as measured by three-dimensional rotation R and three-dimensional translation T):

$$p_c = K[R|T]p_w \qquad (1)$$

where $p_w = [x, y, z, 1]^T$ is a homogenous world point, $p_c = [u, v, 1]^T$ is a corresponding homogenous image point, and K is a camera intrinsic matrix that is known by the decoder for the camera. According to some aspects, the decoder solves the equation for R and T using a perspective-n-point algorithm.

Providing Invisible AR Markers

A method for providing human-invisible augmented reality markers is described with reference to FIGS. 7-10. One or more aspects of the method include identifying AR metadata associated with an object in an image; generating AR marker image data based on the AR metadata; generating a first variant of the image by adding the AR marker image data to the image; generating a second variant of the image by subtracting the AR marker image data from the image; and displaying the first variant and the second variant of the image alternately at a display frequency to produce a display of the image, wherein the AR marker image data is invisible to a human vision system in the display of the image.

Some examples of the method further include extracting the AR metadata from a digital content channel, wherein the display of the image is provided within the digital content channel.

In some aspects, the first variant of the image is generated by adding pixel values of the AR marker image data to corresponding pixel values of the image, respectively. In some aspects, the second variant of the image is generated by subtracting pixel values of the AR marker image data from the corresponding pixel values of the image, respectively.

Some examples of the method further include identifying a visibility parameter. Some examples further include multiplying the AR marker image data by the visibility parameter to obtain scaled AR marker image data, wherein the first variant and the second variant of the image are generated based on the scaled AR marker image data.

In some aspects, the AR marker image data includes an AR marker code. In some aspects, the AR metadata comprises data for displaying an AR version of the object. In some aspects, the AR metadata comprises an address pointing to a storage location for AR image data.

Some examples of the method further include generating an HTML script including the first variant and the second variant of the image, wherein the display of the image is based on the HTML script. Some examples of the method further include displaying the image alternately with the first variant and the second variant of the image.

Some examples of the method further include receiving the display of the image with an AR apparatus. Some examples further include decoding the first variant or the second variant of the image to obtain the AR metadata. Some examples of the method further include generating an AR image corresponding to the object. Some examples further include overlaying the AR image on the image based on the AR metadata.

FIG. 7 shows an example of providing human-invisible AR markers according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 7, the system provides human-invisible augmented reality (AR) markers for displaying an AR object in an AR image. An AR marker apparatus encodes variants of an image with AR marker image data including AR metadata corresponding to an object depicted in the image and alternately displays the image variants via a user device. An AR apparatus decodes one of the displayed variants of the image to obtain the AR metadata and displays the AR image including the AR object based on the AR metadata.

At operation 705, the system encodes a first image by adding AR marker image data to an image. In some cases, the operations of this step refer to, or may be performed by, an AR marker apparatus as described with reference to FIGS. 1 and 2. In an example, the AR marker apparatus extracts the image from a digital content channel such as a website or an HTML-enabled email. In an example, the image depicts an object. In an example, the AR marker image data includes a set of AR markers, and the set of AR markers are codes that provide AR metadata corresponding to the object (such as the scale and surface visual characteristics of the object, as well as camera positioning coordinates) when they are decoded. In some aspects, the AR marker apparatus encodes the first image by adding the AR marker image data to the image as described with reference to FIG. 8.

At operation 710, the system encodes a second image by subtracting the AR marker image data from the image. In some cases, the operations of this step refer to, or may be performed by, an AR marker apparatus as described with reference to FIGS. 1 and 2. In some aspects, the AR marker apparatus encodes the second image by subtracting the AR marker image data from the image as described with reference to FIG. 8.

At operation 715, the system alternately displays the first image and the second image at a human-invisible frequency. In some cases, the operations of this step refer to, or may be performed by, an AR marker apparatus as described with reference to FIGS. 1 and 2. In some aspects, the AR marker apparatus alternately displays the first image and the second image via a screen of a user device described with reference to FIGS. 1 and 5. A human vision system may not be able to detect changes in an image that occur at a sufficiently rapid frequency. Therefore, by alternating a display of the first image with a display of the second image at the sufficiently rapid frequency, the AR marker apparatus provides human-invisible AR markers that can be detected by a camera, thereby integrating AR markers into an image depicting an object so that the object can be projected as an AR object, without affecting the apparent design of the image. In some aspects, the AR marker apparatus alternately displays the first image and the second image as described with reference to FIG. 8.

At operation 720, the system decodes the first image or the second image to obtain AR metadata. In some cases, the operations of this step refer to, or may be performed by, an AR apparatus as described with reference to FIGS. 1, 4, and 5. In some aspects, the AR apparatus is a device such as a smartphone or tablet that includes a camera, a processor unit, a memory unit, and a display. In some aspects, the AR apparatus decodes the first image or the second image (recorded as a video by the camera and displayed on the display) to obtain the AR metadata describing the object and providing the camera positioning coordinates. In some aspects, the AR apparatus decodes the first image or the second image as described with reference to FIG. 10.

At operation 725, the system displays an AR image based on the AR metadata. In some cases, the operations of this step refer to, or may be performed by, an AR apparatus as described with reference to FIGS. 1, 4, and 5. For example, the AR apparatus uses the camera positioning coordinates included in the AR metadata to determine the position of the camera relative to the two-dimensional image the camera is recording as a video, and uses AR image data included in or linked to by the AR metadata to overlay an AR object (a projection of the three-dimensional object onto a two-dimensional space) onto the two-dimensional image the camera is recording and the display is displaying. In some aspects, the AR apparatus displays the AR image as described with reference to FIG. 10.

Encoding Invisible AR Markers

FIG. 8 shows an example of displaying AR marker image data according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 8, an AR marker apparatus identifies AR metadata associated with an object in an image, generates AR marker image data based on the AR metadata, generates a first variant of the image by adding the AR marker image data to the image, generates a second variant of the image by subtracting the AR marker image data from the image, and displays the first variant and the second variant of the image alternately at a display frequency to produce a display of the image, where the AR marker image data is invisible to a human vision system in the display of the image.

At operation 805, the system identifies AR metadata associated with an object in an image. In some cases, the operations of this step refer to, or may be performed by, an AR metadata component as described with reference to FIG. 2.

According to some aspects, AR metadata is information that describes the projection of a three-dimensional object into a two-dimensional space. For example, in some cases, the AR metadata includes numerical representations of a size, a shape, and other surface features of the object. An augmented reality application uses the AR metadata to display an AR version of the object. According to some aspects, the object is displayed in a two-dimensional image hosted on a digital content channel (such as a website, HTML-based email, etc.). According to some aspects, the AR metadata includes position coordinates that provide an AR apparatus with camera positioning information relative to the three-dimensional physical environment the camera is in and to the two-dimensional image the camera is recording, thereby providing the AR apparatus with information to position an AR object in an AR image at a proper scale and position relative to the three-dimensional physical environment depicted as a two-dimensional background image in the AR image.

According to some aspects, the AR metadata includes an address pointing to a storage location for AR image data, such that when AR marker image data including the AR metadata is scanned by an AR apparatus, the AR metadata points the AR apparatus to a storage location (e.g., a cloud storage location such as the database described with reference to FIG. 1) for retrieving AR image data. In this case, the AR image data is the information that describes the projection of the three-dimensional object (e.g., numerical representations of the size, shape, and other surface features of the object) into a two-dimensional space.

According to some aspects, the AR metadata component extracts the AR metadata from a digital content channel. In some cases, the AR metadata is hosted on a digital content channel (such as a website), and the AR metadata component extracts the AR metadata from the host digital content channel via an API request or other suitable method of data extraction. According to some aspects, the AR metadata component likewise extracts the image from a digital content channel.

At operation 810, the system generates AR marker image data based on the AR metadata. In some cases, the operations of this step refer to, or may be performed by, an encoder as described with reference to FIG. 2. According to some aspects, the AR marker image data includes a set of AR markers, and the encoder generates the set of AR markers for the AR metadata. In some cases, an AR marker is a scannable code that provides the AR metadata when it is decoded. By scanning an AR marker with a camera, an AR apparatus receives AR metadata describing both the object's physical appearance (including scale) and the positioning coordinates that provide the AR apparatus with a reference frame to overlay the object on an image displayed in an AR display of the AR apparatus. According to some aspects, an AR marker includes information describing its spacing from other AR markers in the set of AR markers, and this information helps to display the object at a proper scale.

At operation 815, the system generates a first variant of the image by adding the AR marker image data to the image. In some cases, the operations of this step refer to, or may be performed by, an encoder as described with reference to FIG. 2. According to some aspects, the encoder generates the first variant of the image by adding pixel values of the AR marker image data to corresponding pixel values of the image, respectively:

$$I_{ij}^+ = I_{ij}^0 + \delta_{ij} \quad (2)$$

where ij are the pixel coordinates, $I_{ij}$ indicates a pixel intensity of an image I at coordinates ij, $I^+$ is the first variant of the image, $I^0$ is the image, and $\delta_{ij}$ is a parameter equal to 1 if the AR marker image data is white at coordinates ij and equal to 0 otherwise. In digital imaging, a pixel (or picture element) refers to the smallest addressable element in a display device, and the smallest controllable element of a picture represented on the device. In some cases, each pixel may represent a sample of an original image. The color and intensity of each pixel is variable. In color imaging systems, a color may be represented by three or four component intensities such as red, green, and blue, or cyan, magenta, yellow, and black.

At operation 820, the system generates a second variant of the image by subtracting the AR marker image data from the image. In some cases, the operations of this step refer to, or may be performed by, an encoder as described with reference to FIG. 2. According to some aspects, the encoder generates the second variant of the image by subtracting pixel values of the AR marker image data from corresponding pixel values of the image, respectively:

$$I_{ij}^- = I_{ij}^0 + \delta_{ij} \quad (3)$$

where ij are the pixel coordinates, $I_{ij}$ indicates a pixel intensity of the image I at coordinates if, $I^-$ is the second variant of the image, $I^0$ is the image, and $\delta_{ij}$ is a parameter equal to 1 if the AR marker image data is white at coordinates ij and equal to 0 otherwise.

According to some aspects, the encoder identifies a visibility parameter $\alpha$ and multiplies the AR marker image data by the visibility parameter $\alpha$ to obtain scaled AR marker image data:

$$I_{ij}^+ = I_{ij}^0 + \alpha^* \delta_{ij}, I_{ij}^- = I_{ij}^0 - \alpha^* \delta_{ij} \quad (4)$$

For example, generating the first variant and the second variant of the image using a visibility parameter $\alpha$ with a low value makes the AR marker image data in the first variant and the second variant of the image more invisible to both a human vision system and a camera when the first variant and the second variant of the image are displayed on a screen. According to some aspects, the encoder therefore sets the visibility parameter $\alpha$ to a value that mitigates the visibility of the AR marker image data to a human vision system while maintaining the visibility of the AR marker image data to a camera of an AR apparatus. In an example, the visibility parameter α is equal to 0.3. According to some aspects, the first variant and the second variant of the image are generated based on the scaled AR marker image data.

At operation 825, the system displays the first variant and the second variant of the image alternately at a display frequency to produce a display of the image, where the AR marker image data is invisible to a human vision system in the display of the image. In some cases, the operations of this step refer to, or may be performed by, a screen as described with reference to FIG. 1.

A human vision system may not be able to perceive changes in an image that occur faster than a certain frequency. Therefore, according to some aspects, the AR apparatus alternately displays, at a predetermined frequency, the first variant and the second variant of the image via the screen of the user device such that a human vision system can perceive the image in the display of the image but cannot perceive the AR marker image data in the display of the image. According to some aspects, the screen displays the image alternately with the first variant and the second variant of the image to produce the display of the image.

Because the first variant and the second variant of the image each include the image, the AR marker image data included in the first variant of the image is numerically opposite to the AR marker image data included in the second variant of the image, and the first variant of the image, the second variant of the image, and/or the image itself are alternated in the display of the image at a rate that is faster than can be perceived by a human vision system, the display of the image appears to a human observer to be identical to the image itself. However, because a camera of an AR apparatus is capable of perceiving images at a much greater rate than the human vision system, the AR apparatus is able to decode the AR marker image data included in either the first variant or the second variant of the image to use in generating an AR image of the object.

The AR marker system thereby effectively provides human-invisible AR markers for an object in an image, allowing the display of the image to provide a user with access to an AR experience without compromising the design of the image or requiring the use of a more technologically demanding markerless AR device.

According to some aspects, the display of the image is provided within the digital content channel that the image and/or the AR metadata is extracted from. According to some aspects, the AR metadata component generates an HTML script including the first variant and the second variant of the image, wherein the display of the image is based on the HTML script. For example, according to some aspects, the AR metadata component provides the HTML script to the digital content channel, and the HTML script instructs the digital content channel to omit the image and instead alternate the first variant and the second variant of the image as the display of the image in place of the image. The display of the image is then provided via a screen of the user device when the user visits the digital content channel via a web browser.

In some cases, because the AR marker image data is added to the first variant of the image and subtracted from the second variant of the image on a per-pixel basis, the first variant and the second variant of the image each include same pixels corresponding to the original image, and each include pixels corresponding to numerically opposite AR marker image data variants that nevertheless include the same magnitude as each other. Because the pixels correspond to AR marker image data variants that have the same magnitude as each other, the information provided by the AR marker image data variants is the same, and an AR apparatus therefore does not experience an interruption in information received from the AR marker image data via a camera of the AR apparatus when the first variant and the second variant of the image are alternately displayed.

FIG. 9 shows an example of providing a display of an image according to aspects of the present disclosure. The example shown includes AR metadata 900, AR marker image data 905, image 910, first variant of the image 915, second variant of the image 920, and display of the image 925.

Referring to FIG. 9, an AR metadata component of an AR marker apparatus described with reference to FIG. 2 receives AR metadata 900 and generates AR marker image data 905 based on AR metadata 900 as described with reference to FIG. 8. The AR metadata component provides AR marker image data 905 to an encoder of the AR marker apparatus described with reference to FIGS. 2 and 3. The encoder adds AR marker image data 905 to image 910 to generate first variant of the image 915 and subtracts AR marker image data 905 from image 910 to generate second variant of the image 920 as described with reference to FIG. 8. The AR marker apparatus instructs a screen of a user device described with reference to FIG. 1 to alternately display first variant of the image 915 and second variant of the image 920 to produce display of the image 925 as described with reference to FIG. 8.

Image 910, first variant of the image 915, second variant of the image 920, and display of the image 925 are examples of, or includes aspects of, the corresponding elements described with reference to FIG. 3.

Decoding Invisible AR Markers

A method for providing human-invisible augmented reality markers is described with reference to FIG. 10. One or more aspects of the method include receiving a display of an image that includes a first variant of the image alternated with a second variant of the image, wherein the first variant of the image comprises an AR marker image added to the image, and the second variant of the image comprises the AR marker image subtracted from the image; detecting the AR marker image based on the first variant and the second variant of the image; extracting AR metadata from the AR marker image; and displaying an AR image based on the AR metadata.

Some examples of the method further include decoding the AR marker image based on an AR marker detection library to obtain the AR metadata. Some examples of the method further include performing a noise reduction algorithm based on the first variant and the second variant of the image to obtain an enhanced image, wherein the AR marker image is detected based on the enhanced image.

Some examples of the method further include detecting position coordinates for an AR object based on the AR metadata. Some examples further include overlaying the AR object on a background image based on the position coordinates, wherein the AR image includes the AR object overlaid on the background image. Some examples of the method further include identifying an address pointing to a storage location for AR image data. Some examples further include retrieving the AR image data from the storage location, wherein the AR image is displayed based on the AR image data.

Figure 10:
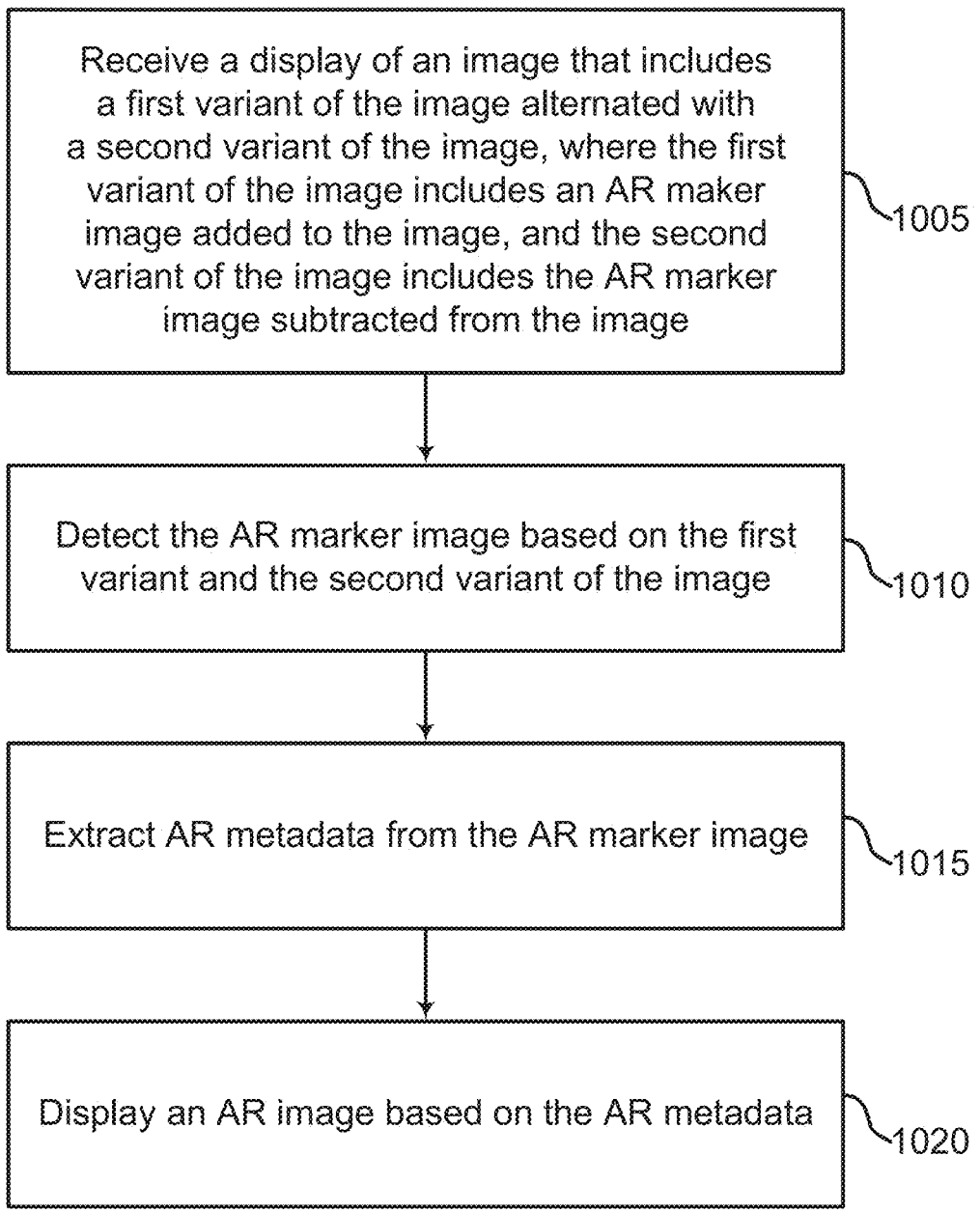
FIG. 10 shows an example of displaying an AR image according to aspects of the present disclosure.

FIG. 10 shows an example of displaying an AR image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 10, an AR apparatus detects an AR marker image included in a display of an image including a first variant of an image and a second variant of an image, extracts AR metadata from the AR marker image, and displays the AR image based on the AR metadata.

At operation 1005, the system receives a display of an image that includes a first variant of the image alternated with a second variant of the image, where the first variant of the image includes an AR marker image added to the image, and the second variant of the image includes the AR marker image subtracted from the image. In some cases, the operations of this step refer to, or may be performed by, an AR apparatus as described with reference to FIGS. 1, 4, and 5. For example, the AR marker image is the AR marker image data described with reference to FIG. 8, and the first variant of the image, the second variant of the image, and the display of the image are generated and displayed as described with reference to FIG. 8. According to some aspects, a camera of the AR apparatus described with reference to FIGS. 4 and 6 receives the display of the image from a screen of a user device described with reference to FIG. 1. For example, the screen displays the display of the image, and the camera records the display of the image as a video through a lens of the camera as a live, continuous feed.

At operation 1010, the system detects the AR marker image based on the first variant and the second variant of the image. In some cases, the operations of this step refer to, or may be performed by, an AR apparatus as described with reference to FIGS. 1, 4, and 5. According to some aspects, the camera provides the video of the display of the image to a decoder of the AR apparatus described with reference to FIG. 4, and the decoder detects the AR marker image from the first variant or the second variant of the image depicted in the video based on an AR marker detection algorithm included in an AR marker detection library.

According to some aspects, the AR apparatus performs a noise reduction algorithm based on the first variant and the second variant of the image to obtain an enhanced image, wherein the AR marker image is detected based on the enhanced image. For example, for each frame $F_i$ of the video, the decoder computes an enhanced image $E_i$. Given a sequence of four consecutive frames of the video, $F_{i-2}$, $F_{i-1}, F_i, F_{i+1}$, the decoder computes SIFT feature points for each of the four consecutive frames, estimates a homography matrix for each of the consecutive frames with respect to $F_i$, generates an aligned image $F'_{i-2}, F'_{i-1}, F'_{i+1}$ with respect to $F_i$, and computes an enhanced image $E_i$:

$$E_i = \frac{F'_{i-1} - F'_{i-2} + F'_{i+1} - F_i}{2} \quad (5)$$

At operation 1015, the system extracts AR metadata from the AR marker image. In some cases, the operations of this step refer to, or may be performed by, an AR apparatus as described with reference to FIGS. 1, 4, and 5. According to some aspects, the decoder of the AR apparatus decodes the AR marker image based on the AR marker detection library to obtain the AR metadata. According to some aspects, the decoder decodes the first variant or the second variant of the image displayed in the video to obtain the AR metadata. According to some aspects, the decoder decodes the first variant or the second variant of the image displayed in an enhanced image of the video to obtain the AR metadata.

According to some aspects, the AR apparatus detects position coordinates for an AR object based on the AR metadata. In some cases, the AR metadata includes camera position coordinates that allows the decoder of the AR apparatus to estimate a position of the camera of the AR apparatus when the camera is recording a video of at least a predetermined number of the AR markers included in the AR marker image. In some embodiments, the predetermined number of the AR markers is four. When the decoder detects at least the predetermined number of AR markers in the video provided by the camera, the decoder obtains a center point from the detected markers, allowing the decoder to place the three-dimensional object (e.g., the AR object) information provided in the AR metadata in the context of the two-dimensional video provided by the camera and displayed on the AR display of the AR apparatus. The estimation of the position of the camera of the AR apparatus is described with reference to FIG. 6. According to some aspects, the decoder detects position coordinates based on an AR marker image included in an enhanced image $E_i$.

At operation 1020, the system displays an AR image based on the AR metadata. In some cases, the operations of this step refer to, or may be performed by, an AR apparatus as described with reference to FIGS. 1, 4, and 5. According to some aspects, the decoder displays the AR object via an AR display of the AR apparatus described with reference to FIG. 4.

In some aspects, the AR apparatus overlays the AR object on a background image based on the position coordinates, where the AR image includes the AR object overlaid on the background image. In an example, the AR display displays the live feed of the video from the camera, or a series of enhanced images $E_i$ determined by the decoder and corresponding to frames of the live feed of the video, and the decoder overlays the AR object on the live feed of the video or the series of enhanced images $E_i$ via the AR display based on the position coordinates and AR object information included in the AR metadata. An example of an AR image is described with reference to FIG. 5.

According to some aspects, the AR apparatus identifies an address pointing to a storage location for AR image data and retrieves the AR image data from the storage location, wherein the AR image is displayed based on the AR image data. For example, in some cases, the AR metadata includes an address pointing to the storage location, and the decoder retrieves the AR image data from the storage location based on the address. In this case, the AR image data is the information that describes the projection of a three-dimensional object into a two-dimensional space described with reference to FIG. 8.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for providing invisible augmented reality markers, comprising:
   identifying, by an AR metadata component of an AR marker apparatus, AR metadata associated with an object in an image;
   generating, by the AR metadata component, AR marker image data based on the AR metadata;
   generating, by an encoder of the AR marker apparatus, a first variant of the image by adding the AR marker image data to the image;
   generating, by the encoder, a second variant of the image by subtracting the AR marker image data from the image, wherein the first variant of the image and the second variant of the image each include a representation of the AR marker image data; and
   displaying, by the AR marker apparatus via a screen, the first variant and the second variant of the image alternately at a display frequency to produce a display of the image, wherein the AR marker image data is invisible to a human vision system in the display of the image.

2. The method of claim 1, further comprising:
   extracting, by the AR metadata component, the AR metadata from a digital content channel, wherein the display of the image is provided within the digital content channel.

3. The method of claim 1, wherein:
   the first variant of the image is generated by adding pixel values of the AR marker image data to corresponding pixel values of the image, respectively; and
   the second variant of the image is generated by subtracting pixel values of the AR marker image data from the corresponding pixel values of the image, respectively.

4. The method of claim 1, further comprising:
   identifying, by the encoder, a visibility parameter; and
   multiplying, by the encoder, the AR marker image data by the visibility parameter to obtain scaled AR marker image data, wherein the first variant and the second variant of the image are generated based on the scaled AR marker image data.

5. The method of claim 1, wherein:
   the AR marker image data includes an AR marker code.

6. The method of claim 1, wherein:
   the AR metadata comprises data for displaying an AR version of the object.

7. The method of claim 1, wherein:
   the AR metadata comprises an address pointing to a storage location for AR image data.

8. The method of claim 1, further comprising:
   generating, by the AR metadata component, an HTML script including the first variant and the second variant of the image, wherein the display of the image is based on the HTML script.

9. The method of claim 1, further comprising:
   displaying, by the AR marker apparatus via the screen, the image alternately with the first variant and the second variant of the image.

10. The method of claim 1, further comprising:
    receiving, by an AR apparatus, the display of the image with an AR apparatus; and
    decoding, by the AR apparatus, the first variant or the second variant of the image to obtain the AR metadata.

11. The method of claim 10, further comprising:
    generating, by the AR apparatus, an AR image corresponding to the object; and
    overlaying, by the AR apparatus, the AR image on the image based on the AR metadata.

12. A method for providing invisible augmented reality markers, comprising:
    receiving, by an AR apparatus, a display of an image that includes a first variant of the image alternated with a second variant of the image, wherein the first variant of the image comprises an AR marker image added to the image, and the second variant of the image comprises the AR marker image subtracted from the image, wherein the first variant of the image and the second variant of the image each include a representation of AR marker image data;

detecting, by the AR apparatus, the AR marker image based on the first variant and the second variant of the image;

extracting, by the AR apparatus, AR metadata from the AR marker image; and displaying, by the AR apparatus, an AR image based on the AR metadata.

13. The method of claim 12, further comprising:

decoding, by the AR apparatus, the AR marker image based on an AR marker detection library to obtain the AR metadata.

14. The method of claim 12, further comprising:

performing, by the AR apparatus, a noise reduction algorithm based on the first variant and the second variant of the image to obtain an enhanced image, wherein the AR marker image is detected based on the enhanced image.

15. The method of claim 12, further comprising:

detecting, by the AR apparatus, position coordinates for an AR object based on the AR metadata; and overlaying, by the AR apparatus, the AR object on a background image based on the position coordinates, wherein the AR image includes the AR object overlaid on the background image.

16. The method of claim 12, further comprising:

identifying, by the AR apparatus, an address pointing to a storage location for AR image data; and retrieving, by the AR apparatus, the AR image data from the storage location, wherein the AR image is displayed based on the AR image data.

17. A system for providing invisible augmented reality markers, comprising:

an AR metadata component configured to identify AR metadata associated with an object in an image;

an encoder configured to generate AR marker image data based on the AR metadata, generate a first variant of the image by adding the AR marker image data to the image, and generate a second variant of the image by subtracting the AR marker image data from the image, wherein the first variant of the image and the second variant of the image each include a representation of the AR marker image data; and a screen configured to display the first variant and the second variant of the image alternately at a display frequency to produce a display of the image, wherein the AR marker image data is invisible to a human vision system in the display of the image.

18. The system of claim 17, the system further comprising:

a cloud storage location configured to store and provide AR image data.

19. The system of claim 17, the system further comprising:

an AR apparatus configured to receive the display of the image, detect the AR marker image data, and extract the AR metadata from the AR marker image data.

20. The system of claim 19, wherein:

the AR apparatus further comprises an AR display configured to display an AR image based on the AR metadata.

* * * * *